United States Patent Office 3,410,694
Patented Nov. 12, 1968

3,410,694
ICE CREAM TYPE PRODUCT
Paul M. La Flamme, New Britain, Conn., assignor of one-half interest to Harry G. Moss, Hamden, Conn.
No Drawing. Filed Nov. 2, 1965, Ser. No. 506,113
8 Claims. (Cl. 99—136)

ABSTRACT OF THE DISCLOSURE

An ice cream type product made from sugar, water, milk products, and flavoring and containing 0.5%–2% by weight of marine vegetable colloid selected from the group consisting of Nouralgine GA/2 and Super-nouralgine TBV/5.

---

This invention relates to a food product and more particularly to an ice cream type food product which, when packaged, may be stored at room temperatures and then frozen when required for serving.

The ice cream industry began more than one hundred and fifty years ago. In the United States, ice cream was sold and known as frozen confection. It was very expensive and was considered as a delicacy for the elite. The primary reason for its being expensive was the refrigeration required in order to continuously maintain the ice cream as a solid. Over the intervening years ice cream became more readily available but remained somewhat of a delicacy due to the requirement of continuous refrigeration. The ice cream formulas used were substantially the same as those used in the early stages of the industry and generally comprised the ingredients of cane sugar, corn syrup, cream, water, flavoring, and a stabilizer such as gelatin. It was necessary to refrigerate the ingredients after combining, during whipping, and to freeze it and thereafter store it at temperatures below freezing.

At about the time of World War II, certain new ice cream ingredients were introduced. For the dairy portion, condensed and powdered milks were introduced; for flavoring, synthetic and artificial flavors were developed; and for stabilizers, new and modified products were developed. The use of synthetic emulsifiers was also introduced to compensate for the naturally occurring emulsifiers found in milk. The production methods used were essentially the same, with the exception that refrigeration, using ice, was replaced by compressor type refrigerators and the whipping of air into the mixture was accomplished by electrical homogenizers. Refrigeration below freezing temperatures was still necessary at all points in the process, during production and continuously during storage. Such refrigeration was required because, if the ice cream were permitted to melt, it generally separated into cream and water phases and, even if it did not separate, in refreezing it became objectionably crystalline.

In view of the foregoing, a new and improved ice cream type food product was required which could be prepared at temperatures above freezing and then stored for long periods of time at temperatures above freezing. Additionally, the new and improved ice cream type food product must have properties permitting it to be frozen after being stored at room temperatures without becoming objectionably crystalline.

Accordingly, an object of this invention is to provide a new and improved food product.

Another object of this invention is to provide a new and improved ice cream type food product which may be prepared and stored at room temperatures.

Another object of this invention is to provide a new and improved food product which, upon freezing, does not become objectionably crystalline and which does not separate into cream and water phases.

A further object of this invention is to provide a new and improved ice cream type food product which will withstand repeated freeze-thaw cyclings without harmful or objectionable effects.

Still other objects and advantages of the invention will in part be obvious and will in part appear hereinafter.

In accordance with this invention, a new and improved ice cream type food product is provided which includes the ingredients commonly used in making ice cream, milk products, sugar products, water and flavoring with the addition of marine vegetable colloids. It has been discovered that the ice cream type food product utilizing the above-mentioned stabilizers permits whipping at temperatures as warm as 40° F. and after sterilization, packaging and storage in metal cans or other containers at temperatures below freezing to sterilization temperatures. The food product is then converted to conventional ice cream by being cooled below freezing.

An alternate procedure comprises mixing the ingredients, subsequently cooling and whipping to increase their volume, sealing the whipped ingredients in a container, and heating the sealed container to sterilize the ingredients. The container may be a metallic can or a gas-impermeable plastic.

It has also been discovered that the new and improved ice cream food product will withstand repeated freeze-thaw cycling without harmful effects. Furthermore, it has been discovered that the range of concentration of these particular stabilizers in the ice cream is critical. For example, it has been discovered that the use of less than about .4% of a stabilizer by weight results in an ice cream type food product which separates into cream and water phases. Furthermore, it has been discovered that if more than about 2% of the stabilizer by weight is included, the food product becomes unpleasant and greasy.

Applicant has discovered that marine vegetable colloids, derived from kelp, such as Nouralgine GA/2 and Super-nouralgine TBV/5, manufactured and sold by the Edward Mendel Company, 185 Ashburton Ave., Yonkers, N.Y., may be utilized as the preferred marine vegetable colloid stabilizers.

The following examples illustrate preferred, but purely illustrative, embodiments of the disclosed invention. It is to be understood that the amounts of the various ingredients can be varied as long as the marine vegetable colloidal stabilizer is maintained at between about .4%–2% by weight of the food product.

EXAMPLE 1

An ice cream type food product of the following composition was made by stirring at 150–160° F.:

| | Grams |
|---|---|
| Condensed milk | 226.8 |
| Cane sugar | 113.4 |
| Water | 567.0 |
| Corn syrup | 56.7 |
| Vanilla extract | .92 |
| Nouralgine GA/2 | 3.58 |

The mixture was then cooled to below about 40° F. and whipped in the presence of air at high speed until the volume had increased by 90–100%. The whipped mixture was then used to fill tinplated cans. The tops of the cans were then sealed and the sealed cans then sterilized at normal sterilization temperatures by heating for fifteen minutes at the temperature produced by 15 lb. pressure of steam. To obtain the ice cream type food product, the container is cooled to a uniform temperature of below 32° F. The contents of the can may be warmed to room temperatures and refrozen a number of times without destroying its palatability.

EXAMPLE 2

An ice cream type food product of the following composition was made by stirring at 150–160° F.:

| | Grams |
|---|---|
| Condensed milk | 226.8 |
| Cane sugar | 113.4 |
| Water | 567.0 |
| Corn syrup | 56.7 |
| Vanilla extract | .92 |
| Super-nouralgine TBV/5 | 3.85 |

The mixture was then combined, cooled to below about 40° F. and whipped, canned and sterilized as in Example 1. When frozen, an ice cream was produced having a pleasing texture and flavor. As before, repeated freeze-thaw cycles were accomplished without producing adverse effects.

EXAMPLE 3

To demonstrate the criticality of the amount of the stabilizer, a formulation identical to that used in Example 2 was prepared, using 2.89 grams or .3% Super-nouralgine TBV/5, in place of 3.85 grams or .4%. The mixture was combined as before and frozen at 30° F. Upon warming to room temperature, the mixture separated into two separate phases, butterfat and water. This behavior was much like that observed with conventional ice creams.

While there has been shown and described some preferred embodiments of the invention, it will be understood that it is not limited to the details shown and described herein and is capable of modification and variation within the spirit and scope of the invention. It is to be further understood that the amount of water, sugar, corn syrup, flavoring and milk products and the use of emulsifiers may be varied as it is conventionally varied today in producing ice cream, as long as the marine vegetable colloid remains between about .4–2% by weight.

It may thus be seen that the objects set forth above, among those made apparent from the preceding description are efficiently attained and, since certain changes may be made in the foregoing composition of matter without departing from the scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. In an ice cream type food product made from sugar, water, milk products and flavoring, the improvement comprising the addition of about .4%–2% by weight of a marine vegetable colloid derived from kelp selected from the class consisting of Nouralgine GA/2 and Super-nouralgine TBV/5 as a stabilizer.

2. A method of making and storing an ice cream type food product made from milk products, sugar products, water, and flavoring, said method comprising the steps of adding .4–2% by weight of a marine vegetable colloid derived from kelp to the other ingredients to increase their volume, sealing the whipped ingredients in a container, and heating the sealed container to sterilize the ingredients; said colloid selected from a group consisting of Nouralgine GA/2 and Super-nouralgine TBV/5.

3. A method in accordance with claim 2, wherein the ingredients are stirred at a temperature of between 150°–160° F.

4. A method in accordance with claim 3, wherein the ingredients are whipped in air to increase their volume by 90–100%.

5. The method according to claim 2, wherein the ingredients are sealed in a metallic can and wherein said ingredients are sterilized by heating the can.

6. The method according to claim 2, wherein the ingredients are sealed in a gas-impermeable plastic container and wherein said ingredients are sterilized by heating said plastic container.

7. The method according to claim 2, wherein the ingredients are sterilized and placed in a sterile container before sealing.

8. The method according to claim 2, wherein the ingredients are cooled to about below 40° F. before whipping.

References Cited

UNITED STATES PATENTS

| | | | |
|---|---|---|---|
| 1,440,011 | 12/1922 | Hosman | 99—136 |
| 2,097,229 | 10/1937 | Lucas | 99—136 |

RAYMOND N. JONES, *Primary Examiner.*

J. M. HUNTER, *Assistant Examiner.*